(No Model.)
A. M. CARLSEN.
ANIMAL TRAP.
No. 558,038. Patented Apr. 14, 1896.
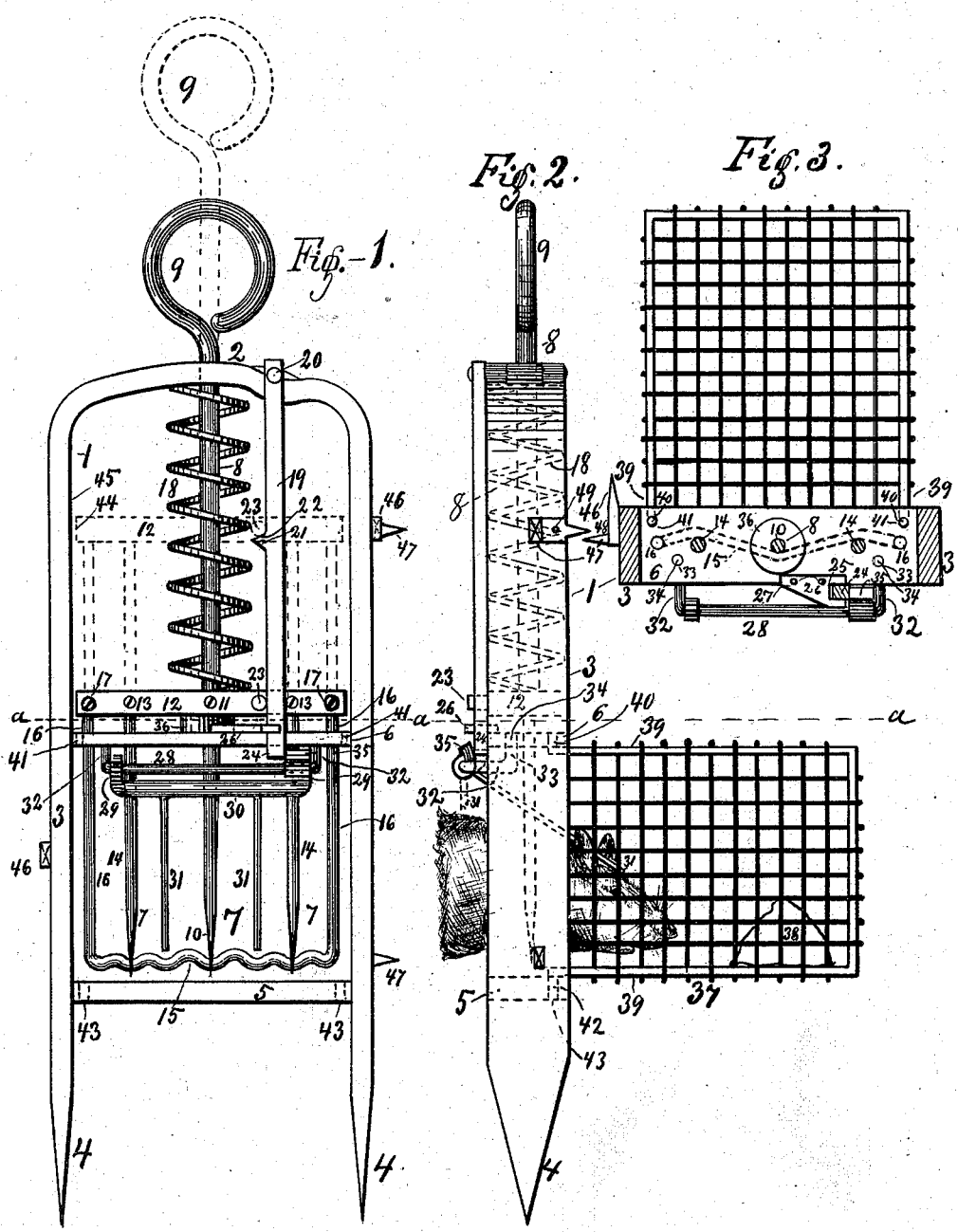
Witnesses.
O. L. Bradbury,
Emil Ellingsen
Inventor.
Andrew M. Carlsen

UNITED STATES PATENT OFFICE.

ANDREW M. CARLSEN, OF ST. PAUL, MINNESOTA.

ANIMAL-TRAP.

SPECIFICATION forming part of Letters Patent No. 558,038, dated April 14, 1896.

Application filed April 27, 1893. Renewed January 28, 1896. Serial No. 577,209. (No model.)

*To all whom it may concern:*

Be it known that I, ANDREW M. CARLSEN, a citizen of the United States, residing at St. Paul, in the county of Ramsey and State of Minnesota, have invented certain new and useful Improvements in Animal-Traps; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in animal-traps.

The object of my invention is to provide a simple, cheap, and efficient animal-trap of such construction that the same one trap is adapted to be placed with a bait in it upon any kind of ground or floor for catching mice, rats, and such other animals as can be attracted by bait, and is also adapted to be placed over a hole cut by rats, mice, gophers, &c., in walls, floors, base-boards, boxes, &c., or in the ground, for catching those animals when passing either out of or into the holes, although they may not want bait, or, if wanting it, have become so wary that no bait in a trap will be touched by them, as is often the case with mice and still more so with old rats. I attain this complicated object by the construction and arrangement of parts illustrated in the accompanying drawings, in which—

Figure 1 is a front elevation of my animal-trap with the bait-box removed. Fig. 2 is a side elevation of the trap with the bait-box attached to it and the head and neck of a rat shown in the position of being caught in the trap. Fig. 3 is a sectional top view on the line *a a* in Figs. 1 and 2.

Referring to the various parts by reference-numerals, 1 designates the main frame of the trap, which may be cast of malleable iron or made from light flat bar or hoop iron. The frame consists of the upper arched bar 2, the parallel side bars 3, having the sharp-pointed ends 4, adapted to be thrust into the ground when the trap is used in the front of a gopher-hole or the like places. Between the side bars 3 I provide two rigid cross-bars 5 and 6, which together with the side bars 3 form the gate 7, in which the animal is caught when trying to pass, or partly passes, through it.

8 is a rod sliding in holes in the middle of the cross-bar 6 and the top bar 2. The top end of this rod is provided with a ring-shaped finger-hold 9, and the lower end is formed into a sharp point or spear 10. Above the cross-bar 6 I secure upon the rod 8, by a set-screw 11, a cross-head 12, the ends of which extend very closely out to, but in their normal position not touching the side bars 3 of the frame. In the cross-head 12 I secure, by set-screws 13, several (in the present instance only two) spears 14.

15 is a corrugated stiff cross-wire placed between the points of the spears in the manner shown in dotted lines in Fig. 3. The ends of this wire are extended upward, as at 16, passed through holes in the cross-bar 6, and secured by set-screws 17 in the cross-head 12.

18 is a pushing coil-spring placed upon the sliding rod 8. When the finger-hold 9 is taken hold of and pulled upward, the spring 18 gets compressed between the arched frame-bar 2 and the cross-head 12, which, when the trap is set, assumes the position shown in the dotted lines in Fig. 1, and is kept in and released from that position by the following described locking and tripping mechanism:

The pendent lever 19, which is suspended from the pivot 20 in the top bar 2 of the frame, is provided at one of its edges with a shoulder or projection 21, upon the inclined upper edge 22 of which catches a pin 23, secured in the front face of the cross-head 12. The lower end 24 of the lever 19 is guided by the notch 25 in a bracket 26, secured at 27 upon the cross-bar 6, as best shown in Fig. 3.

28 is a staple-shaped wire passed loosely through the upwardly-projecting lugs 29 of a trigger formed of said lugs, the horizontal bar 30 and a series of pendants, as 31, (of which in the present instance only two are shown,) the lower ends of which come within a short distance of the cross-bar 5, so that the trigger may be swung to either the front or the rear side of the trap without interfering with the said cross-bar 5. The side bars or arms 32 of the staple-shaped wire 28 are, after the wire is inserted in the lugs of the trigger, bent angularly back near by the outer sides of the lugs, extend in under the cross-bar 6, and then up, as shown in Fig. 2, through holes 33 in said bar 6, and have their ends riveted over at 34, so as to stay rigid in the bar, thus forming a supporting-bar 28 and guiding-arms 32 for the trigger. One of the lugs 29 of the trigger has an upwardly-projecting extension or tooth 35, which engages the outer edge of the end 24 of the lever 19, thereby holding the latter in contact with the pin 23 in the cross-head. Should an animal attempt to pass through the trap in either direction it will push against the pendants 31, causing thereby the tooth 35 to pass by the end 24 of the lever 19, and the latter being thus released is forced sidewise by the action of the spring 18, cross-head 12, and pin 23, which, by pressing upon the inclined face 22 of the projection 21, tends at all times to throw the lever 19 sidewise out of engagement with the said pin 23.

36 is a rubber ring encircling the rod 8 and acting as a cushion between the cross-frame bar 6 and the cross-head 12 to reduce the effect of the blow of the latter upon the former, and, further, to prevent noise, which might draw the attention of and frighten the companions of the caught animal from going into the trap some other time.

37 is a bait-screen, preferably made of wire-cloth, as shown, so that the animal may see and smell the bait freely.

38 represents a piece of cheese or other bait placed in the screen. This screen has only one open side, which is placed against and covers the gate 7 of the trap, so that the animal is bound to enter the deadly gate to reach the bait. The main or corner wires 39 on which the screen is built extend beyond the open end of the screen and have their free ends bent into two upwardly-projecting hooks 40, engaging the holes 41 in the cross-bar 6, and two downwardly-projecting hooks (shown in dotted lines in Fig. 2) engaging the holes 43 in the bottom cross-bar 5. By springing the upper and lower side of the screen slightly toward each other the hooks 40 and 42 become disengaged from the holes in which they are inserted and the bait-screen may thus be detached from or attached to the trap in an instant.

The wire attachment 15 16 is used where mice are the only kind of animals to be trapped, as they are sometimes so small that they would slip between the spears 10 14, or, if pierced by one of the spears, it might be in such a light manner that the animal would suffer a slow and cruel death, which is not the object of catching them.

When the trap is used for other and larger animals than mice, the set-screws 17 are loosened and the wire attachment 15 16 removed, so that the spears 10 and 14 may have a full chance to pierce into the head or neck of the larger animals.

If trapping mostly for animals which are wary of blood-stains on the trap, the traps may be made with the wire bail 15 16 only and the spears dispensed with. Should the slant 22 of the projection 21 of the lever 19 have a tendency to spring the spears and cross-heads away from the lever 19, it is calculated that the end 44 of the cross-head will prevent such springing by touching against the inner side 45 of the side bar 3 of the frame.

46 are sharp prongs provided upon the frame of the trap projecting out beyond the rear of it. 47 are similar sharp prongs provided upon and projecting out from the side of the frame. The rear and side prongs may preferably be made in one angularly-bent piece 48 and secured by a rivet, as 49, to the frame.

It will be understood that when the spears 10 14 or the corrugated wire 15 strikes the animal the latter is squeezed against the cross-frame bar 5, without which the spears or the wire 15 would have little or no effect; also that the spears 10 and 14 may at any time be detached from the cross-head for sharpening, polishing, or for substituting them by new ones if they should get broken or bent out of shape by the animal.

In operation, if the trap be set for gophers and the like animals, the bait-screen 37 is removed, the trap set, and the prongs 4 thrust into the ground close by the hole which the animal is expected to pass into or out of. If set on a floor anywhere to catch rats, the bait-screen should be used with a bait in it, and the trap should preferably be laid down on its side and the prongs 47 pressed sufficiently down in the floor to give the necessary steadiness to the trap. Always when mice are to be caught the corrugated wire attachment or bail 15 16 should be used, unless the trap is made for mice only and thus small enough to secure catching by the spears. If the rats or mice have cut a hole through the floor or base-board or a box, &c., the trap should be set and placed with the gate 7 directly over the hole, and the prongs 46, at the rear side of the trap, thrust into the woodwork of the floor, base-board, &c., outside of the hole, so that the trap will remain at least steady enough for the animal to enter and trip it properly. If trapping for several animals or birds at one time, several traps may be placed in a ring or made the gates of an endless fence or special large bait-box with the bait in the center.

If trapping for snakes, a live frog tied in the bait-screen is a good bait. For fox, skunk, and the like chicken-killers, a chicken may be used, while for bears and wolves a sheep or goat is the preferable bait.

When the animal is in its den the trap may be placed over the opening and secured, and the animal may then, by smoke or water, as the case may permit, be driven out and into the trap without delay.

It is obvious that this trap can be made of any desired size for the trapping of any size and kind of animal, and even for birds and fishes it may be applied, so I do not wish to confine myself as to the size of the trap or the kind of animals to be trapped in it.

I am aware that a trap has formerly been invented with two or three wires twisted and soldered together to make a fork and a coil-spring arranged behind it to drive it into a gopher; but the trigger and a bell-crank lever provided as the tripping mechanism in said trap are of such construction and arrangement that when the trap is set the trigger can only be held in the set position by having its pendants (corresponding to 31 in my drawings) bearing against the front edge of a cross-bar, (corresponding to 5 in my drawings,) which arrangement makes it impossible for an animal to enter the trap from more than one side, (either the front or the rear one,) and as the animals are just as apt to come to the front as to the rear of the trap, and vice versa, they will not only go safely every other time or every other animal, but after once vainly trying to get through the trap from one side they will not be likely to try it from the other side, recognizing it to be the same metallic obstruction that was too hard for their teeth, and thus the said trap is not only useless but a nuisance, making the animals wary of traps, so that I do not claim such worthless construction, although some of the parts of my trap may at the first look have some resemblance of appearance with some of the parts in the trap above alluded to.

What I claim, and desire to secure by Letters Patent, is—

1. In an animal-trap the combination of the frame 1, having the arched top bar 2, the long side bars 3, and pointed ends 4, the guiding cross-bar 6, and the bottom cross-bar 5, the rear prongs 46, and side prongs 47, with the bar 8, sliding in the cross-bars 2, and 6, the same having a handhold as 9, at its top and its bottom end formed into a sharp spear, the cross-head 12, detachably secured upon the rod 8, and having the pin 23, the spears 14, detachably secured in the cross-head 12, the cushion 36, the lever 19, pivotally suspended from the top cross-bar 2, having a slanting side shoulder 22, or projection as 21, engaging the pin 23, in the cross-head, and its lower end guided in a notch or slot in the cross-bar 6, or in a bracket or projection provided upon the said cross-bar, the trigger 30, pivotally suspended in the gate of the trap and having a series of pendants as 31, extending toward but not quite reaching the cross-bar 5, and an upwardly-projecting tooth as 35, engaging the lower end 24, of the lever 19, which it may release by passing it in either forward or backward direction, a coil-spring as 18, acting between the top bar 2, of the frame and the cross-head 12, substantially as shown and described and for the purpose set forth.

2. In an animal-trap the combination of the frame 1, having the side bars 3, the cross-bars 2, 5 and 6, forming a pathway as 7, for the animal to pass through and the prongs 4, 46, and 47, the cross-head 12, having the pin 23, the bar 8, and spring 18, said cross-head having spears as 10, and 14, and the corrugated cross-wire 15, removably secured to it, and traversing the pathway 7, with the detachable bait-screen 37, adapted to be quickly detached from the trap or attached to it with its only open side or end registering with the gate 7, the pivoted locking-bar 19, having the slanting side shoulder 22, the trigger 30, suspended into and nearly crossing the gate 7, and having a tooth engaging the free end of the locking-bar 19, substantially as shown and described and for the purpose set forth.

3. In an impalement-trap and mounted in a suitable frame, the combination with a traveling, spring-actuated cross-head as 12, of the rod 8, the spears 10, 14, and the corrugated wire attachment 15, 16, traversing a gate formed in the frame of the trap and means for tripping the cross-head, substantially as shown and described.

4. The impalement-trap having an elongated frame, with a sliding bar as 8, guided therein and provided at one end with a spring-actuated cross-head having a series of sharp prongs, a tripping-lever having one of its ends pivoted in the upper part of the frame, and being provided with a side shoulder or incline, engaging a pin or lug upon the side of the cross-head, a trigger engaging the lower end of the tripping-lever and having one or more pendants extending into the gate of the trap and being adapted to spring the trap when swung either toward the front or the rear of the trap, substantially as shown and described and for the purpose set forth.

5. In an animal-trap, the combination of a frame having a gate for the animal to enter with a spring-actuated cross-head or cross-bar having a bail traversing the gate, a pin or projection upon the cross-head, a locking-lever engaging said pin or projection, a pivoted trigger having a tooth or projection engaging the locking-lever and one or more arms extending into the gate and being adapted to release the locking-lever, by being pushed toward either side of the gate, substantially as set forth.

In testimony whereof I affix my signature in presence of two witnesses.

ANDREW M. CARLSEN.

Witnesses:
A. P. CROONQUIST,
ANDREW PETERSON.